United States Patent [19]
Dougherty et al.

[11] Patent Number: 5,737,025
[45] Date of Patent: Apr. 7, 1998

[54] CO-CHANNEL TRANSMISSION OF PROGRAM SIGNALS AND ANCILLARY SIGNALS

[75] Inventors: Robert A. Dougherty, Ozona; David A. Kiewit, Palm Harbor; Daozheng Lu, Dunedin; Henry B. Wheeler, St. Petersburg, all of Fla.

[73] Assignee: Nielsen Media Research, Inc., New York, N.Y.

[21] Appl. No.: 395,789

[22] Filed: Feb. 28, 1995

[51] Int. Cl.⁶ .................................................. H04N 7/08
[52] U.S. Cl. .................. 348/473; 348/724; 348/467; 348/2
[58] Field of Search ................... 348/1, 2, 4, 907, 348/906, 180, 467, 461, 460, 473, 486, 476, 488, 10, 13, 731, 724, 723, 725, 726; 455/2, 67.1, 226.1, 67.4, 67.3; H04N 7/00, 7/08, 7/087

[56] References Cited

U.S. PATENT DOCUMENTS

| | | | |
|---|---|---|---|
| 2,982,813 | 5/1961 | Hathaway | 178/5.6 |
| 3,838,444 | 9/1974 | Loughlin et al. | 178/5.2 |
| 3,842,196 | 10/1974 | Loughlin | 358/12 |
| 4,025,851 | 5/1977 | Haselwood et al. | 455/2 |
| 4,044,376 | 8/1977 | Porter | 358/84 |
| 4,058,829 | 11/1977 | Thompson | 358/84 |
| 4,216,497 | 8/1980 | Ishman et al. | 358/84 |
| 4,388,644 | 6/1983 | Ishman et al. | 358/84 |
| 4,425,578 | 1/1984 | Haselwood et al. | 358/84 |
| 4,547,804 | 10/1985 | Greenberg | 358/142 |
| 4,605,958 | 8/1986 | Machnik et al. | 358/84 |
| 4,639,779 | 1/1987 | Greenberg | 358/142 |
| 4,805,020 | 2/1989 | Greenberg | 358/147 |
| 4,931,871 | 6/1990 | Kramer | 358/142 |
| 4,967,273 | 10/1990 | Greenberg | 358/142 |
| 5,243,423 | 9/1993 | DeJean et al. | 348/473 |
| 5,327,237 | 7/1994 | Gerdes et al. | 348/476 |
| 5,425,100 | 6/1995 | Thomas et al. | 380/20 |
| 5,481,294 | 1/1996 | Thomas et al. | 348/1 |
| 5,488,408 | 1/1996 | Maduzia et al. | 348/2 |

FOREIGN PATENT DOCUMENTS

| | | | |
|---|---|---|---|
| WO 94/10799 | 5/1994 | WIPO | H04N 7/00 |
| WO 94/11989 | 5/1994 | WIPO | H04N 5/76 |

*Primary Examiner*—Michael H. Lee
*Attorney, Agent, or Firm*—Marshall, O'Toole, Gerstein, Murray & Borun

[57] ABSTRACT

In the present invention, an ancillary code is added to a composite video signal in its active video portion. The ancillary code may be spread over several frequencies and summed at the output of a decoder to enhance the legibility of the ancillary code at the output of the decoder. Frequency-stepping may be used to add the ancillary code at ones of a plurality of selected frequencies within the bandwidth of the composite video signal. The ancillary code may be hierarchically apportioned between respective uniquely specified sequential segments corresponding to many distribution points of the composite television signal. This hierarchical ancillary code may be frequency-interleaved between harmonics of the horizontal sync frequency of the composite video signal. The ancillary code may be redundantly added above and below the roll-off frequency of a VCR.

34 Claims, 5 Drawing Sheets

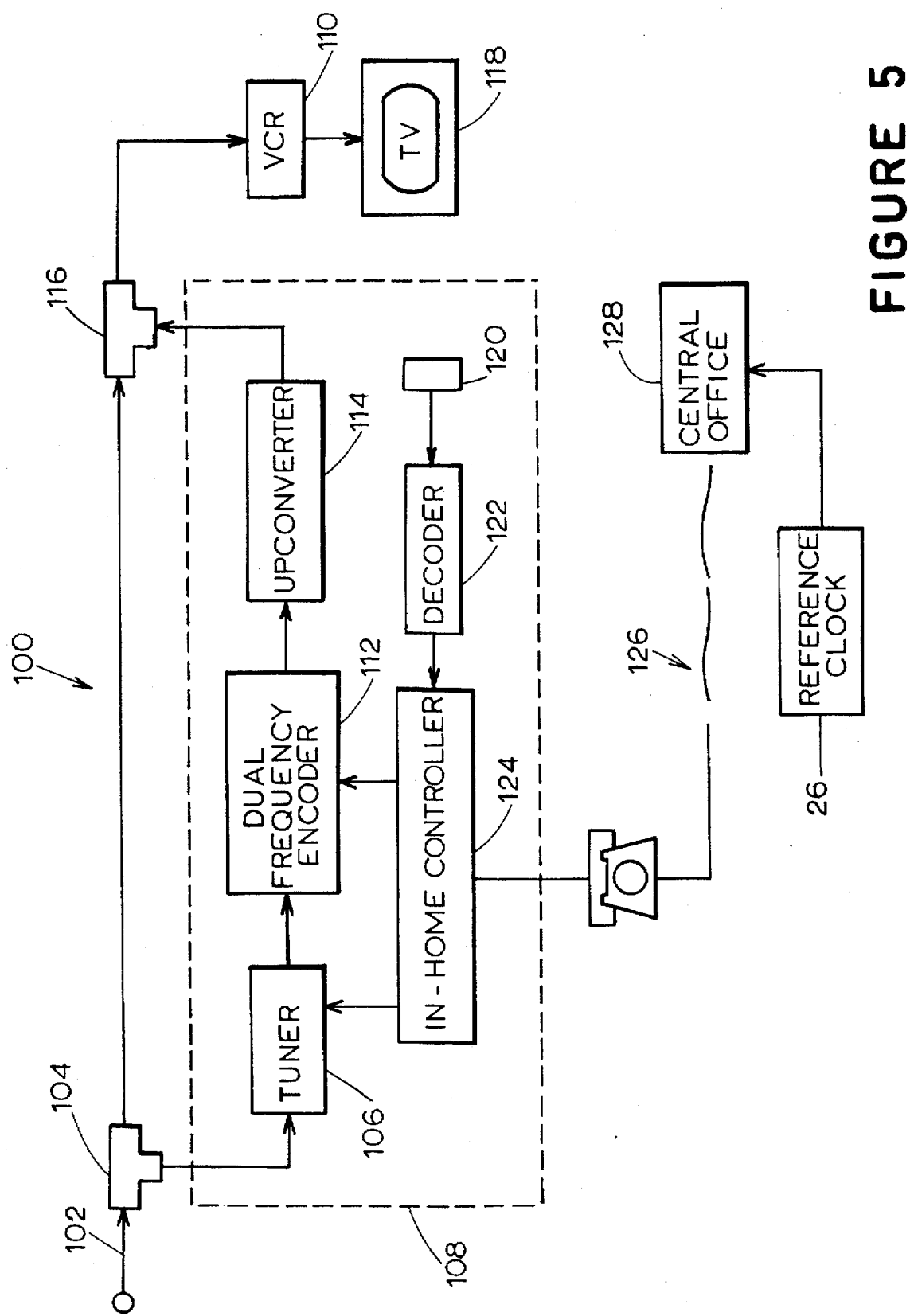

CO-CHANNEL TRANSMISSION OF PROGRAM SIGNALS AND ANCILLARY SIGNALS

FIELD OF THE INVENTION

The present invention relates to a co-channel communication apparatus and a method for concurrently transmitting an ancillary signal with a composite video signal over a single communication channel so that, when the composite video signal is in control of a receiver, the ancillary signal is imperceptible to a viewer.

BACKGROUND OF THE INVENTION

It is known to add ancillary signals to program signals such as radio frequency television and/or radio program signals for a variety of purposes. For example, it is known to add ancillary signals to program signals in order either to monitor the broadcasts of programs or to measure audiences of programs. Such programs may include television programs, radio programs, and/or the like, and the broadcast of such programs may include the transmission of these programs over the air, over a cable, via a satellite, and/or the like.

In a program monitoring system, which responds to ancillary signals in the program, ancillary signals are inserted into the program signals in the form of identification codes which identify the corresponding programs which are broadcast. When monitoring the broadcast of programs, therefore, the program monitoring system senses the identification codes in order to verify that the encoded programs are broadcast. The program monitoring system also usually determines the geographical regions in which these programs are broadcast, the times at which these programs are broadcast, and the channels over which these programs are broadcast.

In a program audience measurement system which employs ancillary signals, an ancillary signal is typically added sequentially to the possible channels to which a receiver may be tuned. When the ancillary signal appears at the output of the tuner of the receiver, the channel tuned by the receiver, as well as program identification codes if any, are identified.

When an ancillary signal is added to a program signal, it must be done in such a way that the ancillary signal is imperceptible to the audience of the program. A variety of methods have been employed in attempts to attain this imperceptibility. Most of these methods can be classified into two groups, a first group in which ancillary signals are added to selected time domains within the program signal, and a second group in which ancillary signals are added to non-interfering frequency domains of the program signal.

One system of the first group, which is commonly used within the United States, is referred to as the "AMOL" system and is taught by Haselwood, et al. in U.S. Pat. No. 4,025,851. This "AMOL" system adds an ancillary signal, in the form of a source identification code, to selected horizontal lines in the vertical blanking intervals of the program signal. Monitoring equipment, which is located in selected regions throughout the United States, verify that the programs are broadcast by detecting the source identification codes of the broadcast programs. The monitoring equipment stores, for later retrieval, these detected source identification codes together with the times at which these source identification codes were detected and the channels on which these source identification codes were detected.

Another system of the first group is taught by Greenberg in U.S. Pat. No. 4,547,804, in U.S. Pat. No. 4,639,779, in U.S. Pat. No. 4,805,020, and in U.S. Pat. No. 4,967,273. In this system, an ancillary signal in the form of a source identification code is placed in either the vertical blanking interval or an overscanned portion of the active video signal. Even though the source identification code is placed in the overscanned portion of the active video signal, it is still not present in the horizontal lines of the video signal which control the visible part of the program and, therefore, is not normally viewed.

Still another system of the first group is taught by Dejean, et al. in U.S. Pat. No. 5,243,423. In this system, an ancillary signal is transmitted over preselected active video lines of a video raster. In order to reduce the perceptibility of the ancillary signal, the video lines over which the ancillary signal is transmitted are varied in a pseudo-random sequence. Alternatively, the ancillary signal may be modulated at relatively low modulation levels by converting the ancillary signal to a spread spectrum ancillary signal.

Still another system of the first group is taught by Thomas, et al. in U.S. Pat. No. 5,425,100. In this system, a multi-level encoding system includes a plurality of encoders each of which selectively encodes information on a uniquely specified, corresponding segment of a program signal. Accordingly, the program signal is divided into a plurality of sequential code segments. The disclosure of allowed U.S. Pat. No. 5,425,100 is herein incorporated by reference.

A system of the second group is taught by Hathaway in U.S. Pat. No. 2,982,813. In this system, an ancillary signal and a television program signal are frequency interleaved so that the ancillary signal is located in a region of the frequency spectrum of the television program signal which is substantially unoccupied. Because the majority of television program signal components are centered about harmonics of the horizontal line scanning rate of the television program signal, the frequency of the ancillary signal is chosen so as to be unequal to any such harmonics. Accordingly, the ancillary signal is intended to be imperceptible.

Another system of the second group is taught by Loughlin, et al. in U.S. Pat. No. 3,838,444. In this system, an ancillary signal is compatibly added and transmitted in a low energy density portion of a color television frequency spectrum. The low energy density portion of interest is located between the video carrier and the color subcarrier of the NTSC television signal, and is at a frequency which is about 2.4 MHz above the video carrier peak in the radio frequency band of the NTSC television signal. Accordingly, this system reduces the interference between the ancillary signal and the television program signal which can result from a system such as that taught by Hathaway.

Furthermore, in U.S. Pat. No. 3,842,196, Loughlin discloses an improved system which minimizes interference between a primary ancillary signal and the program signal by adding a redundant ancillary signal. The redundant ancillary signal is transmitted with an inverted polarity as compared to the primary ancillary signal so that visual artifacts which may otherwise be caused by the addition of an ancillary signal to the program signal are canceled because the viewer's eye averages the luminance from the primary and redundant ancillary signals.

Still another system of the second group is taught by Kramer in U.S. Pat. No. 4,931,871. In this system, a sub-audible ancillary signal is added to the program signal in a narrow bandwidth centered about 40 Hz.

Yet another system of the second group is taught by Gerdes, et al. in U.S. Pat. No. 5,327,237. In this system, an ancillary signal is rasterized at the horizontal scanning rate and is modulated onto a data carrier at a non-integral multiple of the horizontal scanning rate in order to obtain frequency interleaving of the ancillary signal and the composite program video signal.

Moreover, the injection of ancillary signals into a television program signal within a sampled household, which is participating in an audience measurement survey, is also well known. Signal injection systems are taught by Porter and by Thomson in U.S. Pat. No. 4,044,376 and in U.S. Pat. No. 4,058,829, respectively. In these signal injection systems, the antenna input of a sampled television receiver is switched between an antenna and the output of an RF oscillator. The frequency of the RF oscillator is stepped through the channel frequencies of each receivable television signal. Thus, an ancillary signal from the RF oscillator is injected into each channel which carries a television signal. The ancillary signal is injected during the vertical blanking interval of each receivable television signal. A probe within the television receiver determines whether the injected ancillary signal has passed through the tuner. If the injected ancillary signal has not passed through the tuner, the frequency of the injected ancillary signal is changed to a different channel and the process is repeated until the injected ancillary signal is found and the tuned channel thereby identified.

As in the case of these Porter and Thomson systems, interference between the ancillary signal and the television program signals in signal injection systems is commonly avoided by injecting the ancillary signal during the vertical blanking interval of the television program signal. In a household served by a cable system, however, an ancillary signal which is injected during the vertical blanking intervals of a television program signal may interfere with viewing on other television sets in the household that are tuned to other channels and that, therefore, have differently phased vertical sync signals.

A system taught by Machnik, et al. in U.S. Pat. No. 4,605,958 addresses this problem by looping the cable television program signals through a cable meter, through the cable converter, and back through the cable meter before these cable television program signals are passed on to the television receiver. The cable meter includes video switches which are operated to momentarily disconnect the cable television program signals from the cable converter and from the television receiver. While the cable television program signals are disconnected from the cable converter and from the television receiver, the cable meter supplies the cable converter with an injection ancillary signal at one of the frequencies to which the cable converter may be tuned. If the cable converter is tuned to that cable channel, the injection ancillary signal passes through the cable converter and returns back to the cable meter. If the cable converter is not tuned to that cable channel, the injection ancillary signal does not pass through the cable converter and does not return back to the cable meter. Thus, by sensing when the injection ancillary signal passes through the cable converter and back to the cable meter, the cable meter is able to determine the channel to which the cable converter is tuned. Accordingly, the injection ancillary signal is prevented from reaching the television receiver and interfering with reception.

Another signal injection system is taught in published international application Pub. No. WO 94/10799 by Mostafa et al. As taught in this published patent application, a signal generator sweeps through the possible channel frequencies to which a cable converter and a VCR may be tuned. If a channel frequency has been selected by the cable converter and/or the VCR, a corresponding channel detection signal passes through the cable converter and/or VCR to thus identify the tuned channel frequency. Thereafter, an identification code at the frequency of the selected channel frequency is injected into the overscan region of the active video. This identification code includes the channel number of the selected channel frequency, the time of injection, and the serial number of the injector device. Thus, for example, the recorded channel may be determined during playback on the recording VCR, or during playback on another VCR, which is connected to the same or to a different television receiver in the metered household.

Still another signal injection system is taught in U.S. Pat. No. 4,425,578 by Haselwood, et al. In this system, the frequencies of the ancillary signals to be injected are selected so as to avoid erroneous readings. Haselwood, et al. specifically noted that ancillary signals of the type taught by Hathaway are not useful for ancillary signal injection because the amplitude of the ancillary signals must not be too large or else the ancillary signals will swamp the tuner causing interference in the viewed picture. At the same time, the amplitude of the ancillary signals must be large enough so that the ancillary signal is sufficiently above the noise inherent in the video signals to be perceived.

Yet another ancillary signal injection system is taught in U.S. Pat. No. 4,216,497 and in U.S. Pat. No. 4,388,644 by Ishman, et al. As disclosed in these patents, injection signals at the possible channel frequencies to which a receiver may be tuned are injected into the receiver until an injection signal is detected in an output of the receiver. Once the injection signal having the channel frequency to which the receiver is tuned is detected in an output of the receiver, injection signals at only that channel frequency are periodically injected into the receiver. Upon a failure to detect one of these periodically injected signals at an output of the receiver, three additional attempts are made. If all four attempts fail, a new search is made to find the new channel frequency to which the receiver is tuned.

Furthermore, the use of ancillary signals which are injected into television program signals that are to be recorded on a VHS video recorder is limited because of the reduced bandwidth of the recorded signal. The VHS video recording standard allows a response roll-off above about two MHz with an offsetting boost in the higher frequency chrominance carrier. Thus, an ancillary signal may be recorded by a VHS recorder only if the carrier frequency of the ancillary signal is below the roll-off frequency of the VHS video recorder.

Also, the application of digital data compression methodologies to composite video signals has a substantial impact on the usefulness of ancillary signal encoding methods. Some video compression schemes delete the vertical blanking interval and/or reduce the normally overscanned portions of the image. Accordingly, any ancillary signals injected into the vertical blanking interval or into the overscanned portion of a video image may be removed by such compression of the video signals. Digitization may also act to remove spread spectrum ancillary signal codes and other codes relying on low signal amplitudes for their concealment. Additionally, ancillary signal codes transmitted in a high frequency portion of a video signal band may be deleted by compression algorithms that 'clip' the upper frequencies.

The present invention overcomes one or more of the problems noted above.

SUMMARY OF THE INVENTION

In accordance with one aspect of the present invention, a system for transmitting data in the same communication channel as a composite video signal, wherein the composite video signal is transmitted in a frequency band and the composite video signal has a horizontal sync period, comprises a selecting means, a modulating means, and a combining means. The selecting means selects a carrier having a carrier frequency within the frequency band at the beginning of each of a plurality of frequency stepping periods, wherein each frequency stepping period has a duration equal to, or an integer multiple of, the horizontal sync period. The modulating means modulates the data onto the selected carrier to produce a modulated data signal. The combining means combines the modulated data signal with the composite video signal.

In accordance with another aspect of the present invention, a method of adding ones of a plurality of hierarchical ancillary signal codes to a television signal having a frequency band associated therewith, wherein each hierarchical ancillary signal code comprises a time datum and a location datum, wherein each location datum is uniquely associated with one of a plurality of encoders, wherein each encoder has uniquely associated therewith a corresponding one of a plurality of carrier frequencies, wherein each carrier frequency of the plurality of carrier frequencies is in the frequency band, the method comprising the steps of a) modulating each hierarchical ancillary signal code onto a carrier having a corresponding one of the plurality of carrier frequencies, and b) combining each modulated carrier frequency with the television signal.

In accordance with still another aspect of the present invention, a system for transmitting data and a composite video signal in a common communication channel, wherein the composite video signal is transmitted in a frequency band, comprises a selecting means, a modulating means, a combining means, and a demodulating means. The selecting means selects a plurality of carriers, wherein each carrier has a correspondingly unique carrier frequency within the frequency band. The modulating means redundantly modulates the data onto each of the selected carriers. The combining means combines the redundantly modulated carriers with the composite video signal. The demodulating means demodulates the data from the redundantly modulated carriers.

In accordance with yet another aspect of the present invention, a system for metering tuning of television programs in a sampled household and for monitoring broadcasts of television programs, wherein the television programs are transmitted by way of a television signal, and wherein the television signal has a bandwidth, comprises an adding means, a metering means, and a monitoring means. The adding means adds first data to the television signal at a first frequency and adds second data to the television signal at a second frequency, wherein the first and second frequencies are within the bandwidth of the television signal. The metering means meters television tuning by detecting the first data. The monitoring means monitors broadcasts of television programs by detecting the second data.

In accordance with an additional aspect of the present invention, an apparatus for non-intrusive measurement of tuning to a broadcast television signal within a sampled household comprises a modulating means, a non-intrusive acquiring means, and a demodulating means. The modulating means is within the sampled household and modulates a time-varying ancillary code onto a carrier having a carrier frequency within a video bandwidth of the broadcast television signal. The non-intrusive acquiring means is adjacent a display of the television signal and non-intrusively acquires the modulated carrier. The demodulating means demodulates the time-varying ancillary data from the modulated carrier and stores the time-varying ancillary data for subsequent transmission to a central office.

BRIEF DESCRIPTION OF THE DRAWINGS

These and other features and advantages will become more apparent from a detailed consideration of the invention when taken in conjunction with the drawings in which.

DETAILED DESCRIPTION OF THE INVENTION

Figure 1:
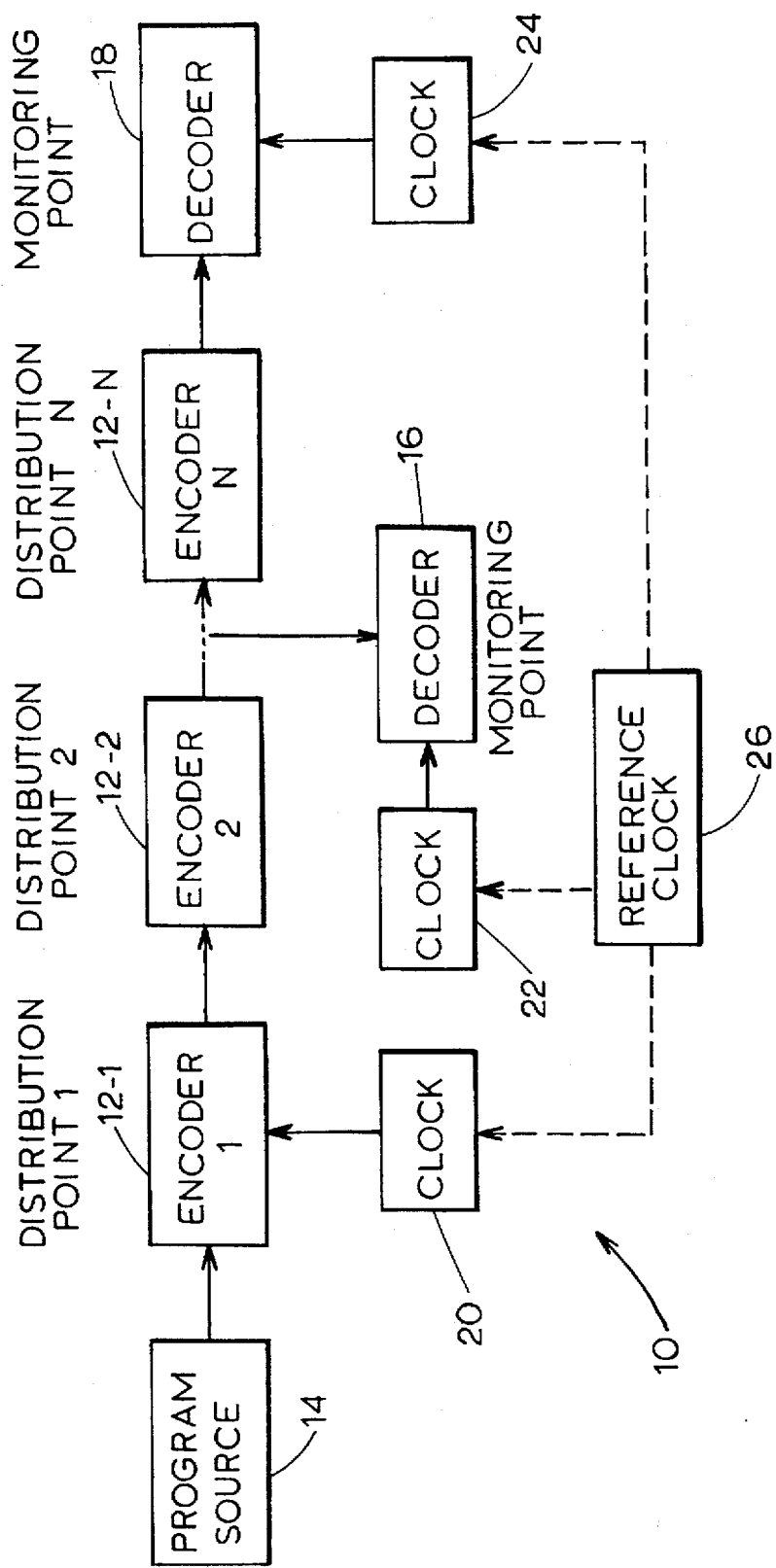
FIG. 1 is a block diagram of a multi-level encoded signal monitoring system according to the present invention.

A shown in FIG. 1, a multi-level encoded signal monitoring system 10, which may be similar to that taught by Thomas, et al. in the aforementioned U.S. Pat. No. 5,425,100, includes a plurality of ancillary signal encoders 12-1, 12-2, ... 12-N. Each ancillary signal encoder 12 may be located at a corresponding stage of distribution of a program signal. The stages of distribution are designated in FIG. 1 as distribution point 1, distribution point 2, ... distribution point N. Each ancillary signal encoder 12 adds a corresponding ancillary signal code into a corresponding segment of a unique multi-level identification (ID) information message of a composite video signal provided by a program source 14.

A plurality of decoders 16 and 18 are provided in association with selected points of distribution of the composite video signal in order to decode the ancillary signal codes which have been encoded onto the composite video signal by the ancillary signal encoders 12-1, 12-2, ... 12-N. The decoder 16 is associated with the distribution point 2 so that it decodes the ancillary signal codes from the composite video signal at the output of the ancillary signal encoder 12-2, and the decoder 18 is associated with the distribution point N so that it decodes the ancillary signal codes from the composite video signal at the output of the ancillary signal encoder 12-N. However, more or fewer decoders may be provided at these or other distribution points.

A clock 20 for providing a time-stamp is coupled to the first ancillary signal encoder 12-1. However, additional clocks, such as clocks 22 and 24, may be coupled to the other encoders and to the decoders, such as the decoders 16 and 18, as well. Such additional clocks are particularly desirable if a secondary time-stamp is to be added to the ancillary signal codes provided by the other ancillary signal encoders 12-2 ... 12-N, as may be the case when a syndicated program is initially transmitted from a central source to a plurality of local stations for re-broadcast. Furthermore, if the present invention is to be operated in a pseudo-random mode, to be described in greater detail hereinafter, a clock is required by each ancillary signal encoder 12-1, 12-2, ... 12-N and by each decoder 16 and 18, and a synchronization clock, which may be in the form of a remote reference clock 26, may be provided in order to synchronize each of the ancillary signal encoders 12-2 through 12-N and each of the decoders 16 and 18 to the ancillary signal encoder 12-1.

Figure 2:
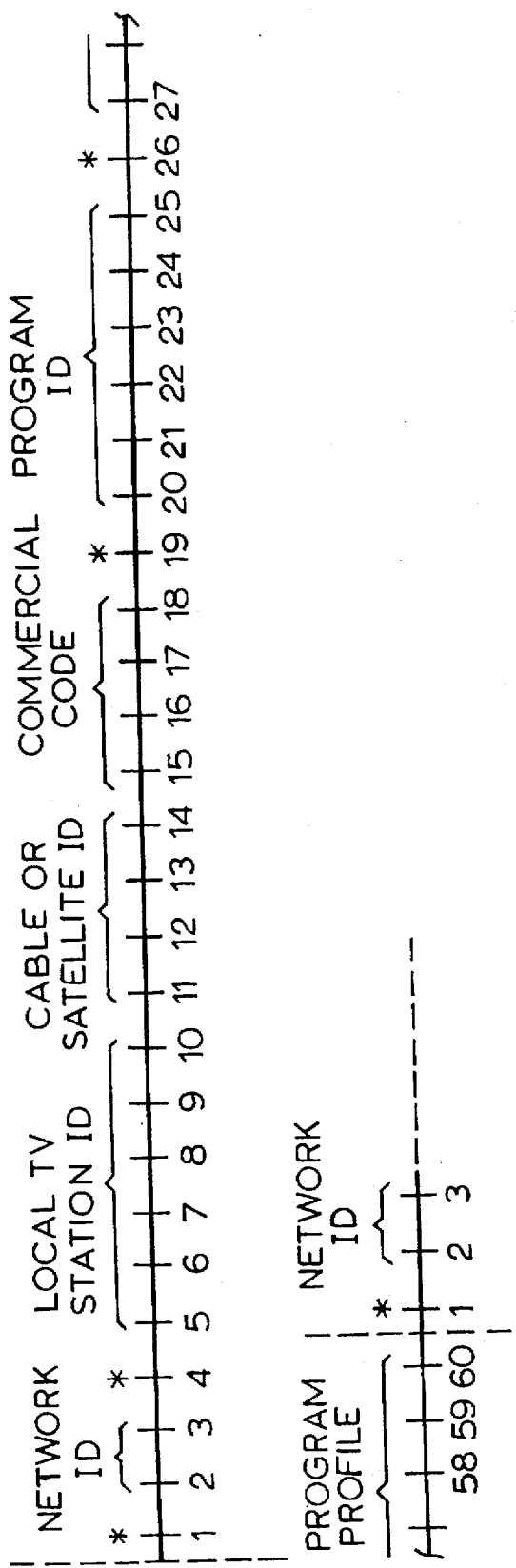
FIG. 2 is a chart illustrating a predetermined format of a universal broadcast code useful in the multi-level encoded signal monitoring system of FIG. 1.

A hierarchical ancillary signal code, which may be similar to the universal broadcast code taught by Thomas, et al. in the aforementioned U.S. Pat. No. 5,425,100, includes a plurality of code segments, as shown in FIG. 2. These code segments may include a network ID, a local station ID, a cable or satellite ID, a commercial ID, a program ID, a program profile describing, for example, the content or rating of the program, and/or the like. Each such ID and profile may be encoded by a separate one of the ancillary signal encoders 12-1, 12-2, . . . 12-N. Other segments, indicated by asterisks in FIG. 2, are left empty during the transmission of a television program so that these "code slots" may be employed for other purposes such as in-home television audience measurements.

Each of the segments shown in FIG. 2 may include one or more frames of a television program signal. Thus, for example, the local TV station ID may be encoded over several frames of the television program signal. However, it should be understood that segments which carry ancillary signals may include any other portion or portions of a program signal.

Figure 3:
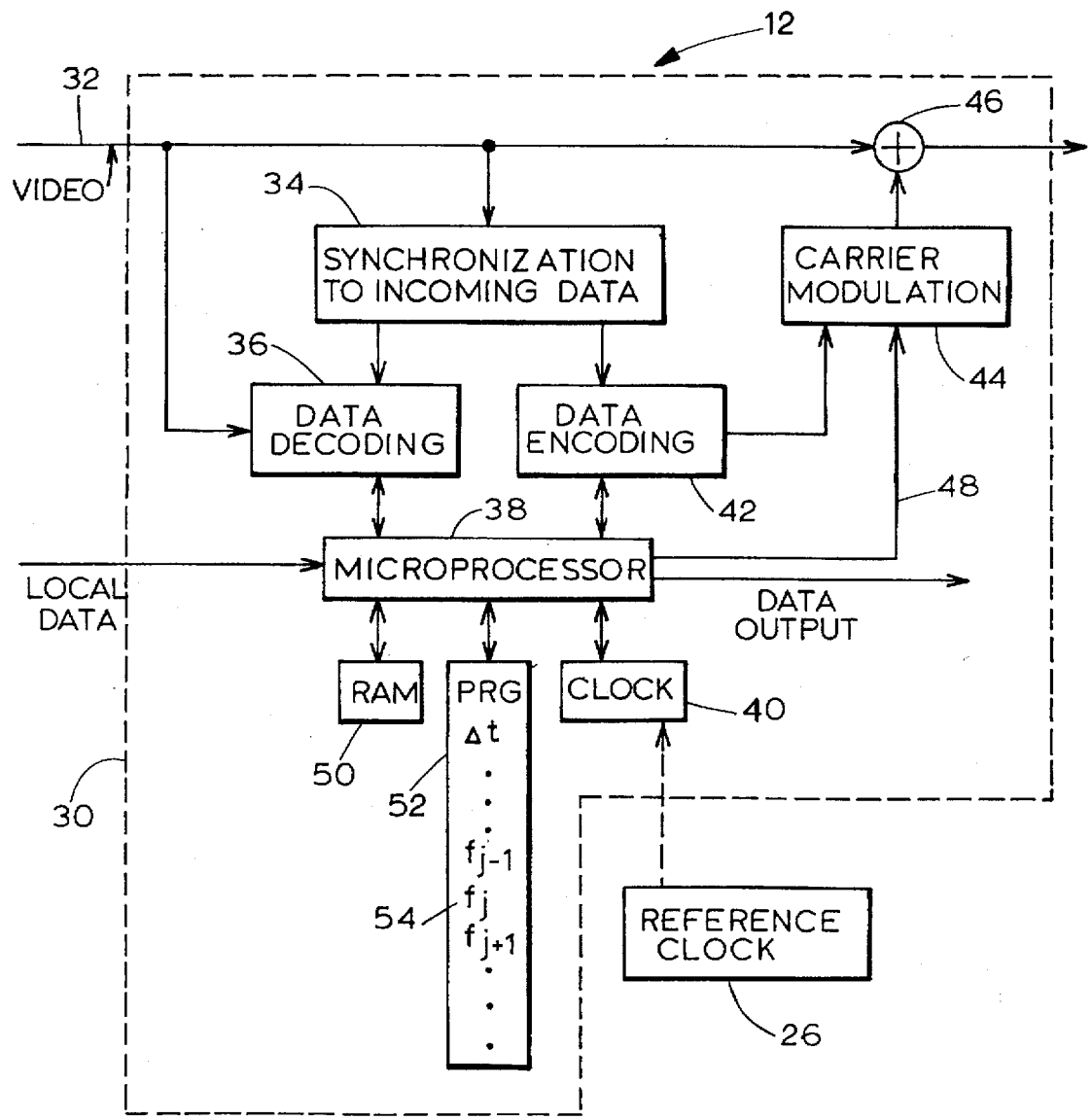
FIG. 3 is a block diagram of an encoder which may be used in the system of FIG. 1 in order to inject a frequency interleaved ancillary signal into a program signal.
Figure 4:
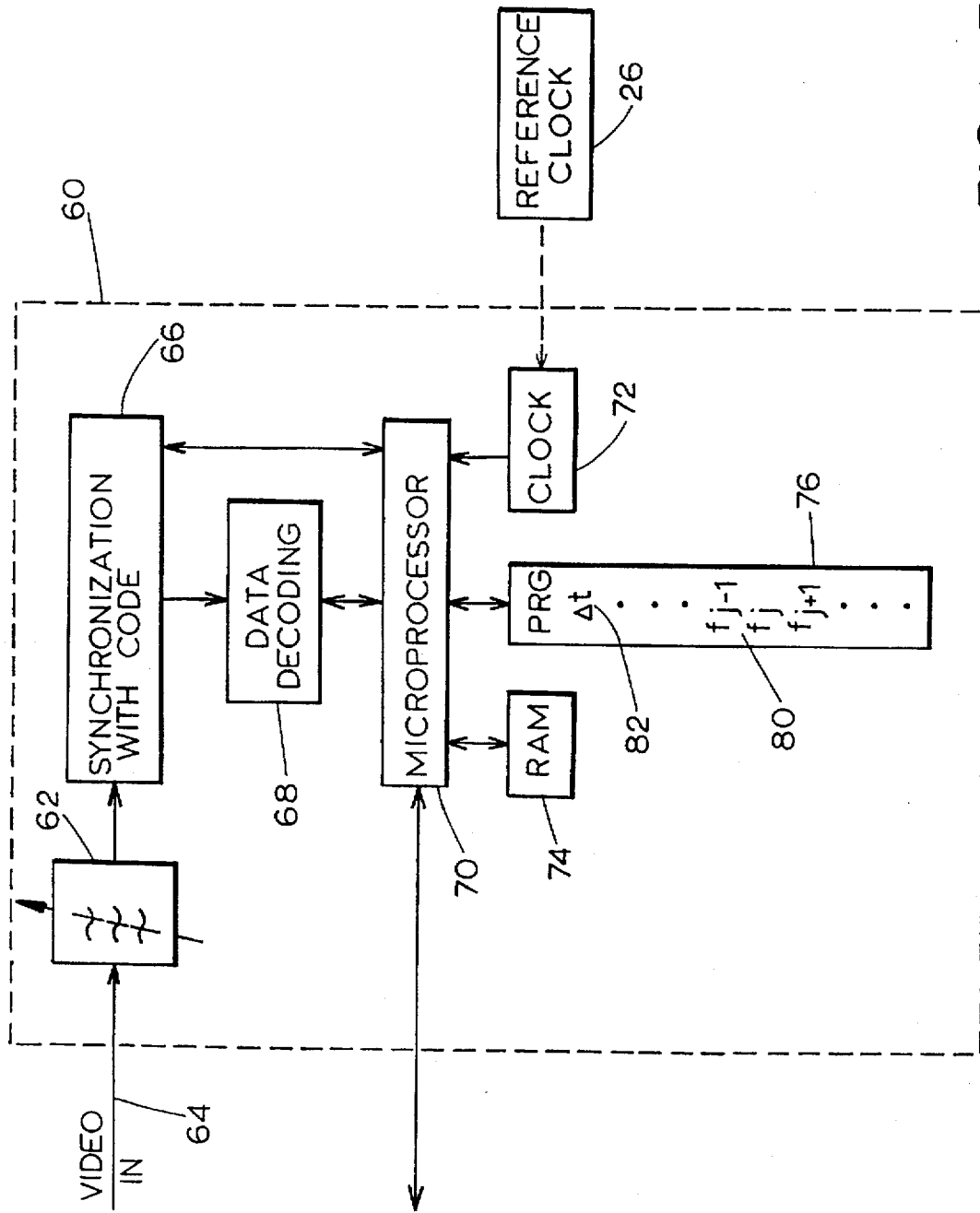
FIG. 4 is a block diagram of a decoder which may be used in the system of FIG. 1; and, FIG. 5 is a block diagram of a non-intrusive television audience measurement system according to the present invention.

An ancillary signal encoder 12 is shown in more detail in FIG. 3. This ancillary signal encoder 12 may be located at an encoding site 30 in the production-distribution-viewing chain of a television broadcast program signal. The encoding site 30 receives a composite video signal, which is received on an input line 32 and which may be obtained as an output from an RF receiver (not shown). This composite video signal is applied to a synchronization block 34 for providing synchronization to the incoming data, which may include an ancillary signal code which is provided by one or more of the other ancillary signal encoders 12-2 . . . 12-N and which may extend over one or more frame periods of the composite video signal. A data decoder 36 couples decoded incoming data to a microprocessor 38 that has associated with it a clock 40 such as the clock 22 or 24 shown in FIG. 1. In a pseudo-random embodiment of the invention, the microprocessor 38 receives synchronization information from the remote reference clock 26.

The ancillary signal encoder 12 also includes a data encoder 42. The data encoder 42 receives an ancillary signal code to be added to the composite video signal, appropriately encodes that ancillary signal code, and applies the encoded ancillary signal code to a carrier modulator 44. This ancillary code may be the data, such as the network ID or the local TV station ID, contained in any of the segments shown in FIG. 2 depending upon the level of distribution at which the encoder 12 is located. The carrier modulator 44, which may be controlled by the microprocessor 38 over a control line 48, modulates a carrier with the encoded ancillary signal code and applies the modulated carrier to an inserter 46. The inserter 46 inserts the modulated carrier into the composite video signal. The encoder 12 also includes memory such as a RAM 50 and a ROM 52.

A decoder 60, which may be used for the decoders 16 and 18, may include a tunable bandpass filter 62 in order to select a frequency of a video signal on an input 64. The decoder 60 also includes a synchronization block 66 for providing synchronization to the incoming data, a data decoder 68 which couples decoded incoming data to a microprocessor 70, and a clock 72 such as the clock 22 or 24 shown in FIG. 1. The clock 72 may be synchronized by the remote reference clock 26. The decoder 60 also includes a memory such as a RAM 74 and a ROM 76.

The multi-level encoded signal monitoring system 10 may be operated in several modes. For example, in one embodiment of the present invention, hereinafter referred to as the single frequency mode embodiment, the microprocessor 38 controls the data encoder 42 so that an ancillary signal code is encoded by the data encoder 42, is modulated onto the carrier by the carrier modulator 44, and is inserted by the inserter 46 into a narrow, non-interfering frequency band within the bandwidth of the composite video signal.

In accordance with the teachings of Hathaway, Loughlin, Gerdes, and others, this ancillary signal code may be in the form of a narrow-band add-on signal having a frequency which is a non-integral multiple of a harmonic of the horizontal sync frequency. Such a signal is generally non-interfering, because most of the power of the composite video signal is clustered at harmonics of the horizontal sync frequency. When operated in the single frequency mode, the ancillary signal encoder 12 only needs a clock 40 if a time-stamp is desired as a part of the added ID code. Moreover, in a hierarchical encoding system in which different ancillary signal encoders 12, such as the ancillary signal encoders 12-1, 12-2, . . . 12-N, provide different parts of the overall ancillary signal code message, such as that shown in FIG. 2, all of the ancillary signal encoders 12 would operate with a common fixed carrier frequency. Hence, in the single frequency mode, the microprocessor 38 would not control the frequency of the carrier modulator 44 so that the control line 48 would not be necessary.

In a second mode of operation, hereinafter referred to as the fixed frequencies mode, a set of narrow-band signal addition channels, each centered about a corresponding non-interfering frequency within the bandwidth of the composite video signal, would be selected for use by all of the ancillary signal encoders 12-1, 12-2, . . . 12-N. As is known, one may select a set of non-interfering frequencies, $f_i$, expressed as $$f_i = f_H(2m+1)/2,$$

where $f_H$ is the horizontal sync frequency, and m is an integer varying between from about 110 to about 209 and from about 246 to about 266. A first low energy density portion of the bandwidth of the composite video signal lying below the chrominance frequency, as taught by Loughlin, et al., corresponds to the values of the integer, m, lying between about 110 and about 209. The frequencies $f_i$ resulting from varying m between about 110 and about 209 cover a range from about 1.7 to about 3.3 MHz above the base of the video band. A second low energy density portion of the bandwidth of the composite video signal lying above the chrominance frequency, as taught by Gerdes et al., corresponds to the values of the integer, m, lying between about 246 and about 266. The frequencies $f_i$ resulting from varying m between about 246 and about 266 cover a range from about 3.9 to about 4.2 MHz above the base of the video band.

Thus, in a fixed frequencies mode, several of the one hundred or so non-interfering frequencies may be selected, and the television signal may be encoded at each of these selected frequencies. The decoder 16 or 18 in a fixed frequencies system would acquire signals at all of the selected frequencies and sum all of these acquired signals. As is known in the communication arts, the summation of signals having both correlated and uncorrelated portions produces an improvement in the signal-to-noise ratio (SNR) of the correlated portion. For a signal in which an uncorrelated portion is random, this improvement is proportional to the square root of the number of signals summed. Therefore, if a correlated ancillary signal code were placed by an ancillary signal encoder 12 in an uncorrelated composite co-channel video signal using four of the frequencies $f_i$, a corresponding decoder 16 or 18 that summed the four frequencies would provide twice the signal to noise ratio as a decoder 16 or 18 operating at a single fixed frequency. Thus, the fixed frequencies mode of operation of the system provides a reduction in co-channel interference by allowing the ancillary signal to be added to a composite video signal at a lower amplitude.

In a third mode of operation, hereinafter referred to as the "stepped frequencies" mode, a sequence of carrier frequencies, $f_j$, is selected by the ancillary signal encoder 12 (e.g., from a table 54 of such frequencies stored in the ROM 52), and sequential portions of the ancillary signal code (or sequential repetitions of the ancillary signal code) are added at each of the frequencies $f_j$ with a predetermined time interval $\Delta t$ (which also may be stored in the ROM 52). The sequence of selected frequencies may or may not follow a simple sequential path from highest to lowest, or lowest to highest. The order of selection of the various frequencies may be chosen so as to minimize the risk of creating a fixed pattern co-channel interference with the composite video signal. For example, a frequency step sequence might be selected to minimize herringbone interference patterns on a monochromatic (e.g., black) screen where it would be more visible than the same interference pattern would be if displayed against a variegated background.

In the stepped frequency mode, the decoder 60 necessarily includes the tunable bandpass filter 62 in order to select the frequencies $f_j$. The tunable bandpass filter 62 steps through the frequencies $f_j$ under control of the microprocessor 70 in synchronism with the ancillary signal code that it is reading. These frequencies may be selected, for example, in accordance with a table of frequencies 80 and a predetermined time interval 82 in the ROM 76.

This predetermined time interval 82 may be the same as the predetermined time interval $\Delta t$ stored in the ROM 52. In order to read an ancillary signal code, the microprocessor 70 initially sets the tunable bandpass filter 62 to pass the frequency at which the initial block of an ancillary signal code is transmitted. When the synchronization block 66 and the data decoder 68 find the beginning of an ancillary signal code, the microprocessor 70 waits for the predetermined time interval 82 (i.e., the frequency stepping period) and then causes the tunable bandpass filter 62 to step to the next frequency $f_j$ where data is expected to be found. When the decoder 60 is not receiving an ancillary signal code, it adjusts the tunable bandpass filter 62 to pass that frequency at which all ancillary signal codes are known to start.

The time duration of a frequency step is preferably set to be substantially longer than a horizontal sync period, or linescan time. If the frequency is stepped too quickly, the stepping operation will produce additional high frequency components of the ancillary signal that may interfere with the co-channel video signal. This interference may be minimized by configuring the system to transmit ancillary signal codes only during active video periods and to switch from one frequency to another during the intervening vertical blanking intervals, i.e., to employ a frequency stepping period that is at least as long as a frame time.

In a variation on the stepped frequency embodiment of the system of the invention, which variation is hereinafter referred to as the pseudo-random mode, the carrier frequency used by an ancillary signal encoder 12 may vary in a pseudo-random fashion in order to further minimize interference between the ancillary signal code and the composite video signal. Pseudo-random frequency stepping, which is well known in the art of real time communication systems, generally requires that all elements of the communication system be synchronized. The television production-distribution-viewing chain commonly incorporates recording and subsequent playback at any point in the chain, and thus generates a signal that appears at some arbitrary later time. Hence, straightforward synchronization is not possible.

Synchronization may be provided, however, by the use of a single sequence initiating input (e.g., the time stamp which is recorded with the program by the initiator thereof, which may be based upon the clock 20, and which may be in the segment labelled "NETWORK ID" in FIG. 2) and by use of the remote reference clock 26 which supplies the ancillary signal encoders 12-1, 12-2, . . . 12-N and the decoders 16 and 18 with a synchronizing time value. A pseudo-random number sequence (or equivalently, a pseudo-random selection of a sequence of frequencies from the set of available non-interfering frequencies $f_j$) may be generated by a program which is stored in the ROMs 52 and 76 and which has the sequence initiating input as an input. That is, the sequence initiating input is used by the encoders 12-1, 12-2, . . . 12-N and the decoders 16 and 18, in effect, to synchronously select the pseudo-random sequence of frequencies.

Accordingly, in the pseudo-random mode of the present invention, each of the ancillary signal encoders 12-1, 12-2, . . . 12-N and the decoders 16 and 18 could use the same pseudo-random number generation algorithm (e.g., which may be stored in the ROMs 52 and 76) having as an input the sequence initiating input in order to select the appropriate sequence of frequencies to be used to encode and decode the ancillary code signal. The predetermined time interval $\Delta t$ as stored in the ROMs 52 and 76 is used to set the time interval between the steps of the frequencies in the pseudo-random frequency sequence.

The foregoing describes the means of stepping all of the elements of the multi-level encoded signal monitoring system 10 in pseudo-random synchronism, but leaves unresolved the question of how the process is to begin, i.e., how the sequence initiating input is to be discovered by a decoder. This start-up problem may be resolved by having the initial part of the ancillary signal code, which includes the sequence initiating input, always broadcast at a single predetermined start-up frequency, which may preferably be a frequency found to offer a minimum value of co-channel interference. According to this method, each of the decoders 16 and 18, when not receiving code, sets its tunable bandpass filter 62 to pass the predetermined start-up frequency, and waits in this status until the sequence initiating input is received. Thus, the system of the present invention provides means of minimizing co-channel interference in a system having one minimally interfering frequency and a plurality of more interfering but pseudo-randomly distributed frequencies.

As shown in FIG. 5, an in-home television audience measurement system 100 includes a source 102 of an RF television signal. The source 102, for example, may be a television cable, an antenna, a satellite dish, and/or the like. The RF television signal is split at a splitter 104 and the channels present in the RF television signals are sequentially tuned by a tuner 106 that is part of an in-home meter 108. Any hierarchical ancillary signal code which is present in the tuned signal at the output of the tuner 106 may have an in-home code (e.g., a time-stamped designation of the channel on which the ancillary signal code is received) added thereto in the RF television signal.

In a version of the in-home meter 108 to be used in households having a VCR 110, a dual frequency encoder 112 can be used to simultaneously and redundantly add the same in-home code both at a first frequency which lies in the low energy density portion of the frequency spectrum of the television signal and which is below the roll-off frequency of a VCR and at a second frequency which lies in the low energy density portion of the frequency spectrum of the television signal and which is above the roll-off frequency of the VCR. This in-home code at the first and second frequencies is added to the RF television signal by way an upconverter 114 and a directional coupler 116, and is supplied to the VCR 110 and to an associated television 118.

A non-intrusive sensor 120, which may be a video probe (i.e., an antenna tuned to video baseband frequencies) or an intermediate frequency antenna (e.g., tuned to the commonly used IF of 44 MHz), acquires the ancillary signal code modulated carrier of the RF television signal from a position which is adjacent to the television 118. The ancillary signal code, which is present in the RF television signal at the time that the RF television signal is received by the in-home television audience measurement system 100, and the in-home code, which is inserted into the RF television signal by the in-home television audience measurement system 100, are demodulated by an in-home dual-frequency decoder 122 and are stored in an in-home controller 124 for subsequent transmission by, for example, a public telephone network 126 to a data collection central office 128.

VCRs of the VHS type will not record the second frequency of the in-home code because this second frequency is above the roll-off frequency of two MHz of such VCRs. Thus, if an RF television signal is viewed at the same time that it is received, the in-home dual-frequency decoder 122 will detect an in-home channel code at both frequencies, but if a signal is viewed on playback from the VCR 110, the in-home dual-frequency decoder 122 will read only the lower frequency code. Thus, the in-home television audience measurement system 100 can distinguish between time-shifted and non-time-shifted viewing in a television audience measurement.

Upon decoding of the in-home code which was added at the first and second frequencies, the in-home controller 124 may compare the in-home code associated with the second frequency to the in-home code associated with the first frequency in order to provide assurance that the in-home code was properly added and decoded.

In another embodiment of the present invention, the ancillary signal added at this first frequency may be used by an in-home metering system to determine tuning of a television, and the ancillary signal added at this second frequency may be used by a monitoring system to verify the broadcasts of television programs. Furthermore, instead of setting the first frequency below the roll-off frequency of a VCR and the second frequency above the roll-off frequency of the VCR, the first frequency may be set below the chrominance frequency of a television signal or even below the roll-off frequency of a VCR and the second frequency may be set above the chrominance frequency of the television signal.

Moreover, first data may be added to the television signal at a first frequency which is below the roll-off frequency of a VCR, second data may be added to the television signal at a second frequency which is above the roll-off frequency of a VCR but below the chrominance carrier frequency of the television signal, and third data may be added to the television signal at a third frequency which is above the chrominance carrier frequency of the television signal. Any one of the first, second, and third frequencies may be used for television metering and any one of the remaining frequencies may be used for program monitoring and verification. Other combinations are possible. Also, the segments of the hierarchical ancillary signal code shown in FIG. 2 may be added by using these three frequencies in any combination.

The desirability of non-intrusive measurement methods (i.e., those that do not require even partial disassembly of the measured entertainment electronic equipment for the purpose of installing sensors) is well established in the television audience measurement art. Prior art systems employing a time-division-multiplexed code (e.g., a code written on predetermined lines of the video raster) have generally required an intrusive connection to the television (e.g., by soldering a lead to a video test point on a circuit board of the television) in order to acquire a signal that could be decoded. The system of the present invention, on the other hand, provides a non-intrusive connection because of the use of the non-intrusive sensor 120. Thus, the system, of the present invention provides non-intrusive detection and decoding of both the ancillary signal code, which is present in the RF television signal at the time that the RF television signal is received by the in-home television audience measurement system 100 and which is transmitted with a television signal in a co-channel mode, and the in-home code, which is inserted into the RF television signal by the in-home television audience measurement system 100.

Although the present invention has been described with respect to several preferred embodiments, many modifications and alterations can be made without departing from the invention. For example, instead of transmitting the sequence initiating input along with the ancillary code signal, as described above, the sequence initiating input may be stored in each encoder and in each decoder. Accordingly, it is intended that all such modifications and alterations be considered as within the spirit and scope of the invention as defined in the attached claims.

We claim:

1. A system for transmitting data in the same communication channel as a composite video signal, wherein the composite video signal is transmitted in a frequency band and the composite video signal has a horizontal sync period, the system comprising:

selecting means for selecting a carrier having a carrier frequency within the frequency band at the beginning of each of a plurality of frequency stepping periods, each frequency stepping period having a duration equal to, or an integer multiple of, the horizontal sync period;

modulating means for modulating the data onto the selected carrier to produce a modulated data signal; and, combining means for combining the modulated data signal with the composite video signal.

2. The system recited in claim 1 wherein:

the selecting means comprises means for selecting a carrier having a plurality of carrier frequencies; and, each of the carrier frequencies is within the frequency band and is selected at the beginning of a corresponding one of the frequency stepping periods.

3. The system recited in claim 2 wherein:

the composite video signal has a horizontal sync frequency; and, each of the carrier frequencies is substantially centered about a corresponding odd multiple of half the horizontal sync frequency.

4. The system recited in claim 1 wherein the composite video signal has a frame period, and wherein each frequency stepping period is equal to, or greater than, the frame period.

5. The system recited in claim 4 wherein:

the composite video signal has a horizontal sync frequency;

the selecting means comprises means for selecting a carrier having a plurality of carrier frequencies;

each of the carrier frequencies is within the frequency band and is selected at the beginning of a corresponding one of the frequency stepping periods; and, each of the carrier frequencies is substantially centered about a corresponding odd multiple of half the horizontal sync frequency.

6. The system recited in claim 1 wherein the selecting means comprises controlling means for controlling the modulation means so that the data are transmitted only during an active video period of the composite video signal.

7. The system recited in claim 6 wherein:

the composite video signal has a horizontal sync frequency;

the selecting means comprises means for selecting a carrier having a plurality of carrier frequencies;

each of the carrier frequencies is within the frequency band and is selected at the beginning of a corresponding one of the frequency stepping periods; and, each of the carrier frequencies is substantially centered about a corresponding odd multiple of half the horizontal sync frequency.

8. The system recited in claim 6 wherein the composite video signal has a frame period, and wherein each frequency stepping period is equal to, or greater than, the frame period.

9. The system recited in claim 8 wherein:

the composite video signal has a horizontal sync frequency;

the selecting means comprises means for selecting a carrier having a plurality of carrier frequencies;

each of the carrier frequencies is within the frequency band and is selected at the beginning of a corresponding one of the frequency stepping periods; and, each of the carrier frequencies is substantially centered about a corresponding odd multiple of half the horizontal sync frequency.

10. The system recited in claim 1 wherein:

the data comprises a time-varying code;

the selecting means, the modulating means, and the combining means comprise a plurality of encoders;

a first encoder of the plurality of encoders combines a first segment of the time varying code with a first predetermined carrier frequency;

the first segment comprises a sequence initiating input;

a second encoder of the plurality of encoders comprises a clock having a current time value as an output;

the second encoder of the plurality of encoders further comprises a memory having stored therein the frequency stepping periods, a plurality of values of the carrier frequency, and a pseudo-random sequence; and, the second encoder of the plurality of encoders reads the first code segment and selects, by use of the pseudo-random sequence at the beginning of a frequency stepping period, the values of the carrier frequency.

11. A method of adding ones of a plurality of hierarchical ancillary codes to a television signal having a frequency band associated therewith, wherein each hierarchical ancillary code comprises a time datum and a location datum, wherein each location datum is uniquely associated with one of a plurality of encoders, wherein each encoder has uniquely associated therewith a corresponding one of a plurality of carrier frequencies, wherein each carrier frequency of the plurality of carrier frequencies is in the frequency band, the method comprising the steps of:

a) modulating each hierarchical ancillary code onto a carrier having a corresponding one of the plurality of carrier frequencies; and, b) combining each modulated carrier frequency with the television signal.

12. The method of claim 11 wherein each carrier frequency of the plurality of carrier frequencies is in a low energy density portion of the frequency band.

13. The method of claim 11 wherein the television signal has a horizonal sync frequency associated therewith, and wherein each carrier frequency of the plurality of carrier frequencies is substantially centered about an odd multiple of half the horizontal sync frequency.

14. The method of claim 13 wherein each carrier frequency of the plurality of carrier frequencies is in a low energy density portion of the frequency band.

15. The method of claim 11 wherein the television signal comprises an active video period and a blanking period, and wherein each encoder combines a corresponding modulated carrier with the television signal only during the active video period.

16. The method of claim 15 wherein each carrier frequency of the plurality of carrier frequencies is in a low energy density portion of the frequency band.

17. The method of claim 15 wherein the television signal has a horizonal sync frequency associated therewith, and wherein each carrier frequency of the plurality of carrier frequencies is substantially centered about an odd multiple of half the horizontal sync frequency.

18. The method of claim 17 wherein each carrier frequency of the plurality of carrier frequencies is in a low energy density portion of the frequency band.

19. A system for transmitting data and a composite video signal in a common communication channel, wherein the composite video signal is transmitted in a frequency band, the system comprising:

selecting means for selecting a plurality of carriers, wherein each carrier has a correspondingly unique carrier frequency within the frequency band;

modulating means for redundantly modulating the data onto each of the selected carriers;

combining means for combining the redundantly modulated carriers with the composite video signal; and, demodulating means for demodulating the data from the redundantly modulated carriers.

20. The system of claim 19 wherein the demodulating means comprises summing means for summing the data demodulated from a first of the redundantly modulated carriers with the data demodulated from a second of the redundantly modulated carriers.

21. The system of claim 19 wherein the demodulating means comprises comparing means for comparing the data demodulated from a first of the redundantly modulated carriers with the data demodulated from a second of the redundantly modulated carriers.

22. The system of claim 21 wherein the demodulating means comprises summing means for summing the data demodulated from a first of the redundantly modulated carriers with the data demodulated from a second of the redundantly modulated carriers.

23. A system for metering tuning of television programs in a sampled household and for monitoring broadcasts of television programs, wherein the television programs are transmitted by way of a television signal, and wherein the television signal has a bandwidth, the system comprising:

adding means for adding first data to the television signal at a first frequency and for adding second data to the television signal at a second frequency, wherein the first and second frequencies are within the bandwidth of the television signal;

metering means for metering television tuning by detecting the first data; and, monitoring means for monitoring broadcasts of television programs by detecting the second data.

24. The system of claim 23 wherein the first frequency is below a roll-off frequency of a VCR, and wherein the second frequency is above the roll-off frequency of the VCR.

25. The system of claim 24 wherein each of the first and second frequencies is within a low energy density portion of the television signal frequency spectrum.

26. The system of claim 23 wherein the television signal has a chrominance frequency, wherein the first frequency is below the chrominance frequency, and wherein the second frequency is above the chrominance frequency.

27. The system of claim 26 wherein each of the first and second frequencies is within a low energy density portion of the television signal frequency spectrum.

28. The system of claim 23 wherein the adding means adds third data to the television signal at a third frequency.

29. The system of claim 28 wherein the first, second, and third frequencies are within low energy density portions of the television signal.

30. The system of claim 29 wherein the first frequency is below a roll-off frequency of a VCR, wherein the third frequency is above the frequency of the VCR but below a chrominance carrier frequency of the television signal, and wherein the second frequency is above the chrominance carrier frequency of the television signal.

31. An apparatus for non-intrusive measurement of tuning to a broadcast television signal within a sampled household, the apparatus comprising:

modulating means within the sampled household for modulating a time-varying ancillary code onto a carrier having a carrier frequency within a video bandwidth of the broadcast television signal;

non-intrusive acquiring means adjacent a display of the television signal for non-intrusively acquiring the modulated carrier; and, demodulating means for demodulating the time-varying ancillary data from the modulated carrier and for storing the time-varying ancillary data for subsequent transmission to a central office.

32. The apparatus of claim 31 wherein the broadcast television signal comprises a co-channel transmitted time-varying ancillary data signal.

33. An apparatus for non-intrusive measurement of tuning to a broadcast television signal within a sampled household, the apparatus comprising:

modulating means within the sampled household for modulating a time-varying ancillary code onto a carrier having a carrier frequency within a video bandwidth of the broadcast television signal;

non-intrusive acquiring means adjacent a display of the television signal for non-intrusively acquiring the modulated carrier, wherein the non-intrusive acquiring means comprises a video probe; and, demodulating means for demodulating the time-varying ancillary data from the modulated carrier and for storing the time-varying ancillary data for subsequent transmission to a central office.

34. An apparatus for non-intrusive measurement of tuning to a broadcast television signal within a sampled household, the apparatus comprising:

modulating means within the sampled household for modulating a time-varying ancillary code onto a carrier having a carrier frequency within a video bandwidth of the broadcast television signal;

non-intrusive acquiring means adjacent a display of the television signal for non-intrusively acquiring the modulated carrier, wherein the non-intrusive acquiring means comprises an intermediate frequency probe; and, demodulating means for demodulating the time-varying ancillary data from the modulated carrier and for storing the time-varying ancillary data for subsequent transmission to a central office.

* * * * *